Oct. 14, 1947.  D. K. ALLISON  2,429,152
OZONIZER CONSTRUCTION
Filed June 29, 1942

INVENTOR
DONALD K. ALLISON
BY Floyd Spence
ATTORNEY

Patented Oct. 14, 1947

2,429,152

UNITED STATES PATENT OFFICE 2,429,152

OZONIZER CONSTRUCTION

Donald K. Allison, Beverly Hills, Calif.

Application June 29, 1942, Serial No. 448,988

3 Claims. (Cl. 204—313)

My invention relates to ozonizer constructions and among the objects of my invention are:

First, to provide an ozonizer cell comprising sets of electrostatic plates disposed in air passages between a series of dielectric separators, wherein the passageways are confined in width to the effective width of the electrostatic plates;

Second, to provide an ozonizer cell wherein variation in temperature rise between different portions of the dielectric separators is prevented, thereby permitting the use of glass or other material which would fracture or warp if subjected to uneven temperature distribution;

Third, to provide an ozonizer cell which is particularly adapted for use in my ozonizer described in my copending application, Serial No. 399,910, filed June 26, 1941, now Patent No. 2,405,728, granted August 13, 1946; and Fourth, to provide a novelly arranged conductive plate for ozonizers which facilitates complete presentation of the air to silent discharge or corona produced by reason of the highly stressed electrical field set up between the sets of plates.

With the above and other objects in view, as may appear hereinafter, reference is directed to the accompanying drawing, in which.

Figure 1:
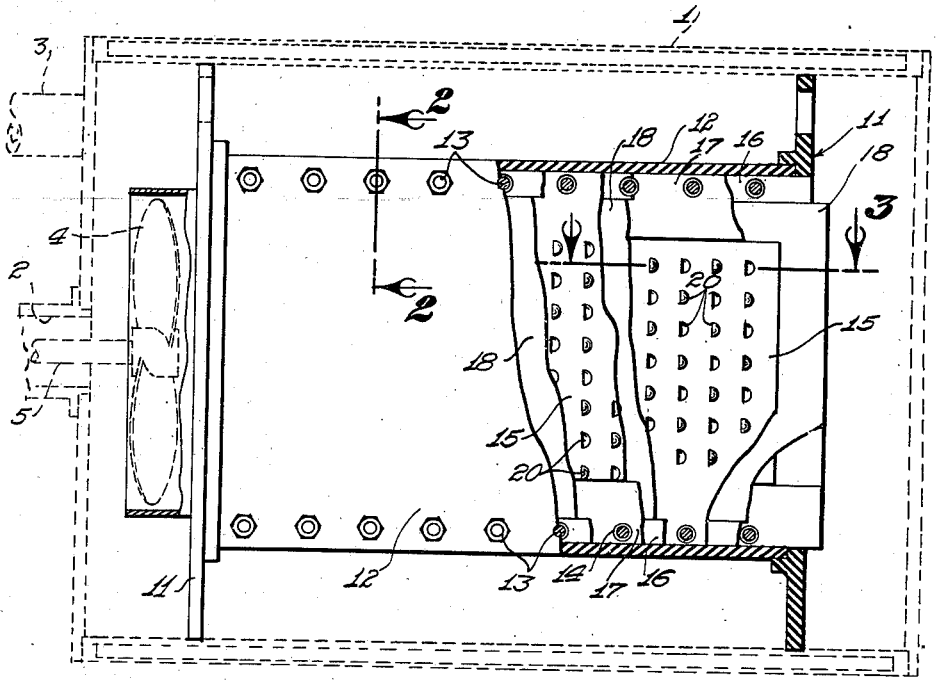
Figure 1 is a side elevational view of my ozonizer construction with parts and portions broken away to facilitate the illustration and showing the ozonizer construction within an ozonizer shell, the shell being indicated by broken lines.

My ozonizer construction or cell is particularly designed for use in conjunction with the ozonizer described in my aforementioned copending application. The ozonizer therein described comprises a cylindrical shell 1 enclosed at its ends, having an air intake 2 and an ozone outlet 3. A circulation propeller 4 is provided within the shell driven by a shaft 5 connected with an air motor not shown. My ozonizer cell is supported within the shell 1 by a pair of spacer rings 11. Each spacer ring is provided with marginal ports and a main central opening which may be rectangular or square and which receives a tubular housing 12 of rectangular or square cross section. Extending transversely across the top and bottom sides of the housing 12 are tie bolts 13. The tie bolts carry sleeves 14 which serve to space electrostatic plates 15. One set of electrostatic plates depends or hangs from the upper series of tie bolts, while the other set of electrostatic plates extends upwardly from the lower set of tie bolts.

The tie bolts 13 also carry spacer strips 16 and 17 which fit over the spacer sleeves 14. The spacer strips 17 are wider than the spacer strips 16 to define therebetween channels at the upper and lower sides of the housing to receive the upper and lower margins of the dielectric plates 18. The electrostatic plates 15 of one set extend downwardly between alternate spacer strips 17 and corresponding dielectric plates 18 to a point clear of the spacer strips and are then offset into centered relation therewith. The extremities of each set of electrostatic plates extend into close proximity to the remaining spacer strips 17. Thus the spacer strips 17 virtually fill the spaces between the extended ends of one set of electrostatic plates and the supported ends of the other dielectric plates, and thereby define with the dielectric plates passageways 19 which are coextensive with the overlapping portions of the electrostatic plates.

Figure 3:
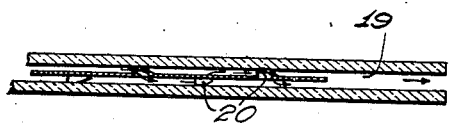
Figure 3 is an enlarged sectional view through 3—3 of Figure 1 showing one of the electrostatic plates and the adjoining dielectric plate, indicating by arrows the manner in which air flows through the passageway between the dielectric plates.
Figure 2:
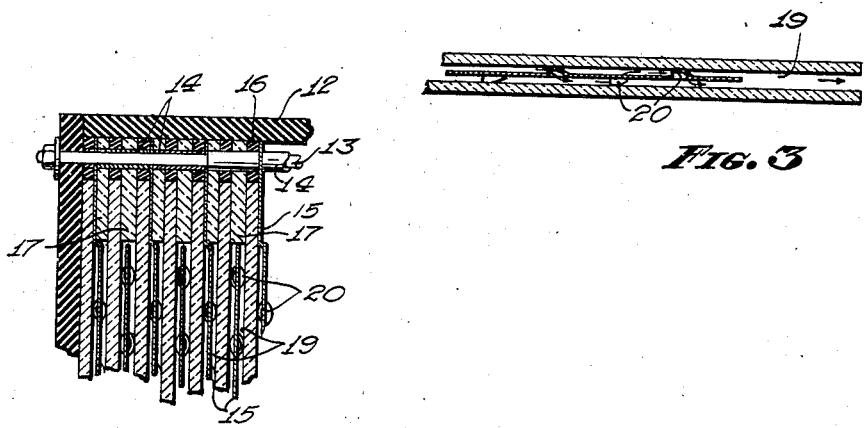
Figure 2 is an enlarged fragmentary transverse sectional view taken through 2—2 of Figure 1.

Each electrostatic plate is provided with a plurality of rudimentary louvres 20 in the form of quarter spherical extrusions having open sides facing in the direction of flow of the air. The extrusions protrude alternately from opposite sides of the electrostatic plates to cause the air to flow back and forth between the sides thereof, as well as to hold the electrostatic plates in centered relation in the passageway 19, as shown in Figure 3.

The corona discharge produced by the highly stressed electrical field created between the electrostatic plates only takes place between the overlapping portion of the electrostatic plates. Only the corresponding areas of the dielectric plates become heated. It is essential that these areas be cooled, but any air that is allowed to flow along the margins of the dielectric plates beyond the overlapping portions of the electrostatic plates has little or no cooling effect on the active areas, and furthermore is not subjected to the corona discharge, and therefore is not changed to ozone. The marginal spacer members 17 confine the air flow to the effective area of the electrostatic plates and utilize all the air for both cooling and treatment. Full use of the air increases the cooling effect thereof and prevents undue rise of temperature of the central portions of the dielectric plates, which might cause excessive temperature variation between the margins and central portions of the dielectric plates.

Various changes and alternate arrangements may be made within the scope of the appended claims, in which it is my intention to claim all novelty inherent in the invention.

I claim:

1. An ozonizer construction comprising two sets of flat electrostatic plates, the plates of one set fitting between the plates of the other set whereby each plate includes an overlapping effective portion confronting the adjacent plates of the other set and a marginal ineffective portion projecting beyond the extremities of said confronting plates, the marginal portions of the plates in each set being electrically connected together; flat dielectric plates between said electrostatic plates; the effective portions of each of said electrostatic plates being formed with spaced-apart spacer members on opposite sides thereof contacting adjacent dielectric plates to space and firmly support said effective portions of each electrostatic plate from adjacent dielectric plates and thereby render both sides of said portions active with corona discharge; and marginal dielectric members covering the marginal portions of said electrostatic plates; said dielectric plates and marginal dielectric members defining passageways coextensive with but confined to the overlapping portions of said electrostatic plates, said spacer members on opposite sides of each electrostatic plate being constituted by rudimentary louvres facing the direction of air flow through said passageways to direct the air back and forth between opposite sides of the electrostatic plates.

2. An ozonizer construction comprising a plurality of dielectric plates; marginal dielectric members separating said plates, said plates and members defining respectively the sides and edges of a plurality of air passages; and an electrostatic plate in each passageway extending from one marginal dielectric plate to the other, each of said electrostatic plates being formed with spaced-apart spacer members on opposite sides thereof contacting adjacent dielectric plates to space and firmly support each electrostatic plate from adjacent dielectric plates and thereby render both sides of said portions active with corona discharge; alternate electrostatic plates being electrically connected to form two sets of electrostatic plates, the overlapping portions of which are exposed to and co-extensive with said passageways, said spacer members on opposite sides of each electrostatic plate being constituted by rudimentary louvres facing the direction of air flow through said passageways to direct the air back and forth between opposite sides of the electrostatic plates.

3. An ozonizer construction comprising a series of flat dielectric plates and marginal dielectric strips defining respectively the sides and edges of a plurality of air passages; two sets of electrostatic plates arranged alternately and having exposed overlapping effective portions coextensive with the spaces between the marginal strips and extended portions clamped between alternate marginal dielectric strips and adjacent dielectric plates, whereby air circulates over the effective portions only of said electrostatic plates, said effective portions of said electrostatic plates being formed with spaced-apart spacer members on opposite sides thereof contacting adjacent dielectric plates to space and firmly support each electrostatic plate from adjacent dielectric plates and thereby render both sides of said portions active with corona discharge, said spacer members on opposite sides of each electrostatic plate being constituted by rudimentary louvres facing the direction of air flow through said passages to direct the air back and forth between opposite sides of the electrostatic plates.

DONALD K. ALLISON.

REFERENCES CITED

The following references are of record in the file of this patent:

UNITED STATES PATENTS

| Number | Name | Date |
| --- | --- | --- |
| 955,818 | Lohman | Apr. 19, 1910 |
| 979,999 | Piestrak | Dec. 27, 1910 |
| 1,044,700 | Small | Nov. 19, 1912 |
| 991,767 | Armstrong | May 9, 1911 |
| 1,064,064 | Franklin | June 10, 1913 |
| 2,093,619 | Powell | Sept. 21, 1937 |
| 788,557 | Sahlstrom | May 2, 1905 |
| 1,743,202 | Forrest | Jan. 14, 1930 |

FOREIGN PATENTS

| Number | Country | Date |
| --- | --- | --- |
| 9,282 | Great Britain | 1913 |
| 108,293 | Great Britain | Aug. 2, 1917 |
| 263,356 | Great Britain | Dec. 30, 1926 |
| 2,488 | Great Britain | 1894 |
| 17,885 | Great Britain | 1903 |